E. P. BRENNAN.
SNAP-HOOK.

No. 188,578. Patented March 20, 1877.

Witnesses:
John M. Deemer.
Harry Smith.

Edward P. Brennan
by his Attorneys
Howson and Son

UNITED STATES PATENT OFFICE.

EDWARD P. BRENNAN, OF DOYLESTOWN, PENNSYLVANIA.

IMPROVEMENT IN SNAP-HOOKS.

Specification forming part of Letters Patent No. 188,578, dated March 20, 1877; application filed January 24, 1877.

*To all whom it may concern:*

Be it known that I, EDWARD P. BRENNAN, of Doylestown, Bucks county, Pennsylvania, have invented a new and useful Improvement in Snap-Hooks, of which the following is a specification:

The object of my invention is to construct a hook with a spring-retaining dog of such a character as to admit of the ready connection of a trace-ring to and disconnection from the said hook.

This object I attain in the manner which I will now proceed to describe, reference being had to the accompanying drawing, in which—

Figure 1:
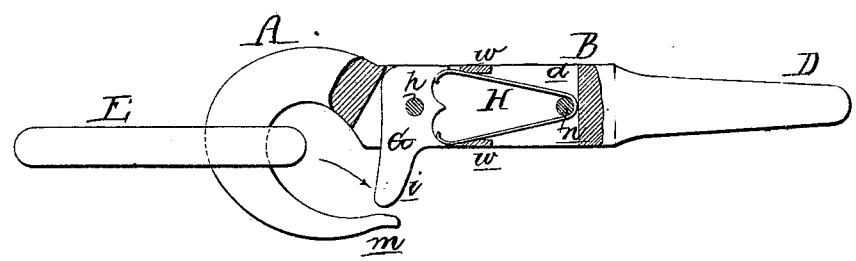
Figure 2:
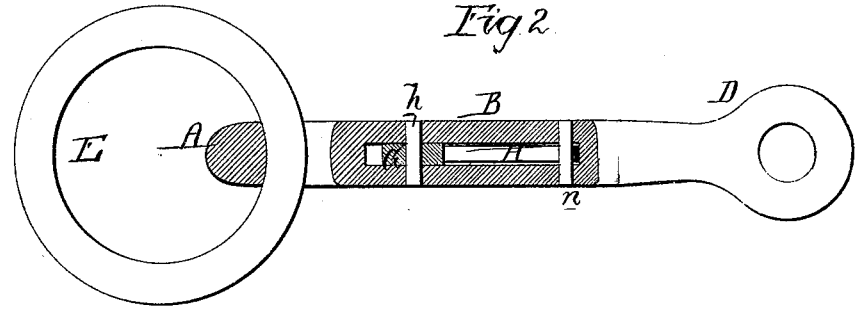

Figure 1 is a side view, partly in section, of my improved trace-hook, and Fig. 2 a sectional plan on the line 1 2, Fig. 1.

A is the hook proper; B, its stem, terminating in an eye, D, for attachment to the hames or other object.

An elongated slot, $a$, is made through the stem B for the reception of a dog, G, and a spring, H, the dog being pivoted to a pin, $h$, passing through the stem B, and having a projection, $i$, which extends nearly to the outer end $m$ of the hook.

The spring H consists, in the present instance, of a bent strip of steel held in place by a pin, $n$, and presenting two elastic arms with curved ends, both arms bearing against the edge of the dog, one in a recess on one side, and the other in a recess at the opposite side of the pivot-pin, so that the tendency of the duplex spring is to maintain the dog in its normal position, shown in Fig. 1.

The outward movement of the two arms of the spring is restricted by stops $w$ $w$, which extend across the slot $a$.

While the spring-arms are sufficiently rigid to prevent the trace-ring E, under ordinary circumstances, rom becoming detached from the hook when the former is moved in the direction of the arrow, the forcible pressure of the ring against the dog will cause the latter to yield, and permit the ring to be detached from the hook, and when the ring has to be connected to the latter, all that is necessary is to adjust it to bear on the end of the dog, and pull it in the direction contrary to that pointed out by the arrow, when the dog will yield and permit the ring to enter the hook, after which the dog will resume its former position.

It will be evident that the above-described hook affords facilities for coupling and uncoupling traces more readily than the usual strap and buckle fastening, or than the usual form of snap-hook.

I claim as my invention—

1. The combination of the hook A and its slotted stem B with the dog G and the bent spring H, the opposite ends of which are adapted to recesses in the dog on opposite sides of the pivot-pin, as described.

2. The combination of the dog G, the two spring-arms, and the stops $w$ $w$, for restricting the movement of the said arms, as specified.

In testimony whereof I have signed my name to this specification in the presence of two subscribing witnesses.

EDWARD P. BRENNAN.

Witnesses:
HERMANN MOESSNER,
HARRY SMITH.